UNITED STATES PATENT OFFICE.

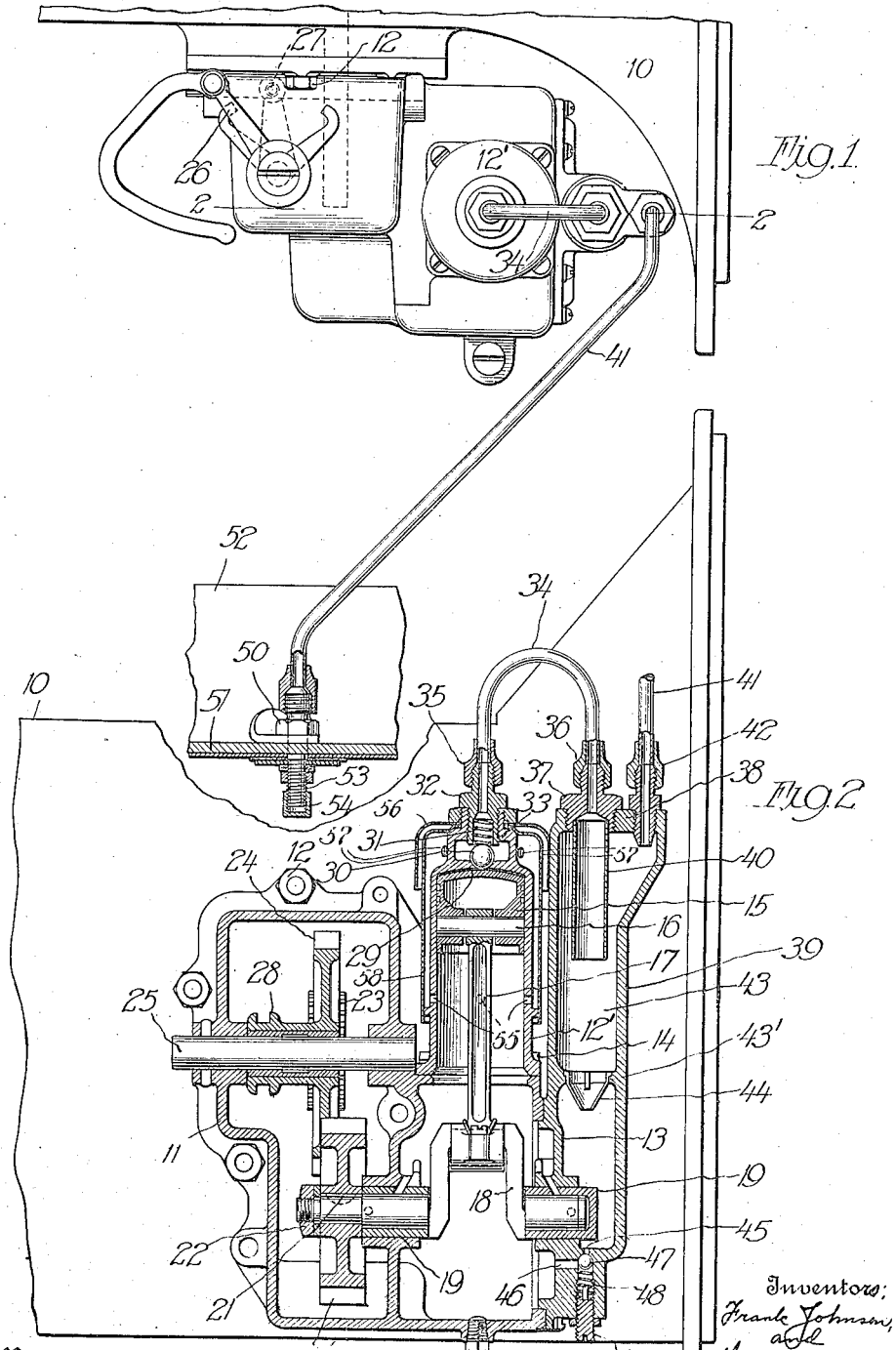

LYLE K. SNELL AND FRANK JOHNSON, OF DETROIT, MICHIGAN, ASSIGNORS TO CADILLAC MOTOR CAR COMPANY, OF DETROIT, MICHIGAN, A CORPORATION OF MICHIGAN.

COMPRESSOR SYSTEM.

1,324,079.  Specification of Letters Patent.  Patented Dec. 9, 1919.

Application filed January 29, 1916. Serial No. 74,987.

*To all whom it may concern:*

Be it known that we, LYLE K. SNELL and FRANK JOHNSON, citizens of the United States, both residents of Detroit, Wayne county, State of Michigan, have invented certain new and useful Improvements in Compressor Systems, of which the following is a specification.

This invention relates to compressor systems, and particularly to oil trap devices and blow off mechanisms therefor.

One of the objects of this invention is to provide a pump mechanism, particularly of the pneumatic type, for effectively separating any lubricant, or other liquid, from the medium circulated thereby.

Another object is to return such liquids to the pump mechanism, if desired.

Another object is to prevent the discharge from the system, of the liquids present in the circulating medium of pneumatic pump mechanisms, upon the opening of the usual blow off valve devices which are provided.

Another object is to utilize the blow off valve devices of pneumatic pump mechanisms, for returning, to the pump, any lubricant or other liquid, which is formed in the pump mechanism or its distributing lines.

These, and other objects, will appear from the following description, taken in connection with the accompanying drawings, which form a part of this specification, and in which:

Figure 1 illustrates a plan view of a pump mechanism, embodying a preferred form of this invention, as applied to the power plant of a motor vehicle; and Fig. 2 is a longitudinal vertical section, substantially on the line 2—2 of Fig. 1.

Referring to the drawings, 10 represents the usual change speed gear box of a motor vehicle, and 11 a pump mechanism, which may be secured thereto, as by bolts 12. The pump may be of either the single cylinder or multicylinder type, consisting of a cylinder 12′, which may be mounted on a base, or crank case 13, and secured thereto, as by bolts 14. The usual piston 15 is arranged in the cylinder, and is provided with a piston pin 16, and a connecting rod 17, which is connected at its lower end in the usual manner to a crank shaft 18, which may be arranged in bearings 19 of the crank case 13. The crank shaft 18 has a gear 20 arranged at one end thereof, and secured thereto in driving relation by suitable means, such as a key 21 and a bolt 22. This gear is adapted to be driven from a gear 23, which may be arranged on the usual driving shaft, not shown, within the gear box 10. The gears 20 and 23 may be connected through an idler gear 24, or disconnected therefrom, as desired. The idler gear is slidably arranged on a shaft 25 mounted in the crank case 13 and may be shifted by any suitable means, such as a crank 26, which is secured to the yoke 27, which is adapted to surround the shifting collar 28 formed integral with the gear 24. The pump mechanism is provided with the usual intake ports 55 formed in the cylinder wall and which are overrun by the piston at the ends of both its upward and downward strokes, and to which ports the air flows past the lower edge of a guard 56 and through holes 57 and then downward about the cylinder within the jacket 58; and with a discharge port 29, which may be automatically opened and closed by means of a check valve, consisting of a ball member 30 and a spring 31, adjustably secured in position by means of a threaded cap 32, arranged in the head 33 of the cylinder 12′. A discharge conduit 34 may be connected at one of its ends by means of a coupling 35 to the threaded cap 33, and at its opposite end by means of a coupling 36 to a threaded cap 37, which may be arranged in the top 38 of a trap casing 39, which may be formed integral with the crank case 13.

It will be noted that a downwardly extending tube or deflector 40 is fitted within the cap 37, and may be secured thereto, as by brazing or a pressed fit. A distributing line 41 is shown as coupled to a threaded nipple 42, which is also led into the upper part 38 of the casing 39. An oil pocket 43 is arranged in the lower part of the casing 39 and is provided with an inwardly extending flange 43′, in which a separating thimble 44 is arranged. The lower part of the pocket 43 is provided with an outlet port 45, in communication with a passage 46, which leads into the crank case 13. This port may be controlled by an automatic valve device, consisting of a ball member 47, a spring 48, and adjusting plug 49. This valve mechanism may serve as the blow off valve device for the pump mechanism, as will more fully appear hereinafter. As the pump mechanism, which has been described, is shown as adapted for compressing air for use in vehicle tires, the distributing line 41 may be led to a union 50, arranged in the web 51 of a frame side member 52, and is provided with a threaded nipple 53, which may be closed by a cap 54 when the pump is not in use.

While it has been generally known that it is desired to supply to tires, compressed air which is free from lubricant or other liquids, the means heretofore available have not efficiently given the desired results, in a way which has been satisfactory, but having thus described the general construction and arrangement of the parts embodied in our invention which achieves the desired results, its operation will be understood to be as follows: Assuming the pump to be in operation and the pressure in the distributing line to be below the desired degree, the valve mechanism 47 will be closed, and the air from the pump will be directed downwardly by the deflector 40 into the casing 39, and any oil, which may be in the air, will be separated therefrom, and finally drained into the bottom of the pocket 43 before it is discharged into the distributing line 41, and when the pressure goes above that for which the valve mechanism is adjusted, the valve will be automatically opened, thus draining back into the crank case any lubricant which has formed in the pocket 43. In this way, the lubricant for the pump mechanism is retained, and at the same time a very efficient means of compressing air, free from lubricants and other liquids, is produced, for use under conditions where a comparatively dry air or gas is desired.

While we have described and illustrated what we deem to be a preferred mode of application of our invention, it will be understood that various modifications and changes may be made without departing from the spirit and scope thereof.

Having thus described our invention, what we claim and desire to secure by Letters Patent is:

1. In combination in an air compressing system of the class described, a pump adapted to compress air; a hollow trap casing; a conduit leading from said pump and discharging into the upper portion of said trap casing; an air distributing line or conduit leading from the upper portion of said trap casing; a normally closed relief passage leading from the lower portion of said trap casing; and an automatically operated valve adapted to open the said relief passage upon a rise of pressure within said trap casing.

2. In an air compressing system of the class described, the combination with a pump adapted to compress air, of a vertically extending hollow trap casing; a conduit leading from said pump and discharging into the upper portion of said trap casing; an air distributing line or conduit leading from the upper portion of said trap casing; a normally closed relief passage leading from the lower portion of said trap casing; and means the operation of which is dependent upon a rise of pressure within said trap casing for opening said relief passage to thereby permit a flow of fluid from the interior of said trap casing.

3. In an air compressing system of the class described, the combination with a pump adapted to compress air, of a vertical extending hollow trap casing; a conduit leading from said pump and discharging into the upper end of said trap casing; an air distributing line or conduit leading from the upper end of said trap and casing; a relief passage leading from the lower end of said trap casing; and a normally closed valve associated with said relief passage and adapted to open upon a rise of pressure within said trap casing to thereby permit a flow of fluid through said relief passage.

4. In combination in an air compressing system of the class described, a pump adapted to compress air; a vertically extending hollow trap casing; a conduit leading from said pump and discharging into the upper end of said trap casing; an air distributing line or conduit leading from the upper end of said trap casing; a relief passage leading from the lower end of said casing; a valve for controlling the flow of fluid through said relief passage; a spring acting upon said valve to keep the same in a normally closed condition; and means for adjusting the tension of said spring.

5. In an air compressing system of the class described and in combination, a pump comprising a cylinder, a reciprocating piston, a crank shaft for operating said piston, and a crank case within which said crank shaft is located; a vertically extending hollow trap casing; a conduit leading from said pump cylinder and discharging into the upper end of said trap casing; an air distributing line or conduit leading from the upper end of said trap casing; a relief passage leading from the lower end of said trap casing to and discharging into said crank case; and an automatically operated valve adapted to open the said relief passage and permit a flow of fluid therethrough and into said crank case upon a rise of pressure within said trap casing.

In testimony whereof, we affix our signatures.

LYLE K. SNELL.
FRANK JOHNSON.